Patented Sept. 4, 1934

1,972,098

UNITED STATES PATENT OFFICE 1,972,098

CUPRAMMONIUM PROCESS FOR DISSOLVING CELLULOSE

Werner Kleinicke, Patchogue, N. Y., assignor to Johnson-Losee Corporation, Long Island City, N. Y., a corporation of New York No Drawing. Application August 1, 1933, Serial No. 683,230

4 Claims. (Cl. 106—40)

My present invention relates to improvements in the cuprammonium process of making regenerated cellulose. The invention seeks to produce concentrated solutions of cellulose in a comparatively short time while avoiding the difficulty of having to deal with freshly precipitated cupric hydroxide.

Prior to my invention it has been customary to effect solution of cellulose by immersing it in a solution of copper hydroxide in ammonia. My invention is founded on a discovery by me that the cellulose is dissolved by the following procedure: A soluble copper salt of suitable type is first dissolved in ammonia to which solution the cellulose fiber, preferably suitably prepared, is added. When the fiber has been fully wet by the solution an alkali solution is then added, whereupon the cellulose dissolves at once. This procedure I have found to conduce to more concentrated cellulose solutions while involving fewer manipulations. In the reaction, if caustic soda is used as the alkali the sodium salt is formed corresponding to the soluble copper salt started with. This salt if properly chosen has been found not to have any detrimental effect in the subsequent operations in which the cellulose is involved. Thus far I have found copper sulphate or acetate to be satisfactory in this respect.

The invention will be best understood by the following example illustrative thereof: 250 grams of copper-sulphate, $CuSO_4.5H_2O$, is dissolved in 450 grams ammonium hydroxide of 26 Bé. after which 125 grams of cotton fiber previously prepared for solution are added. After the fiber has become thoroughly wet with the solution, 80 grams of sodium hydroxide in 150 grams of water are added, whereupon the fiber dissolves at once to give an approximately 16% solution of cellulose.

Any suitable cellulosic material may be brought into solution by the method of the present invention. Previous to the making of the solution as described, the cellulose should be prepared for solution in any well-known manner, the preparation obviously depending upon the nature of the raw material. Various raw materials are well known, such as cotton in various forms, wood pulp, bagasse, etc., and the preparation of such cellulosic material solution is well understood.

As a specific example of a use of a desirable form of cotton material and a preferred preparatory treatment therefor, the following example is given: Cotton seed hulls, as for example, ordinary cotton seed press cake, are boiled two hours in a 2% caustic soda solution at 5 pounds pressure. The solid material is then separated from the used liquid, washed until the washings are colorless or nearly so, and the fibers then centrifuged. The fibers thus treated are then subjected to a second soda boil for one-half hour using a fresh solution of 2% caustic soda. The used liquor from this step is preferably used in the first soda boil and the material is then washed. The thus purified fibers may optionally be bleached, for which a solution of sodium hydrochlorite can be used which may be prepared in the following manner: To one pound of chlorinated lime $Ca(COCl)_2.H_2O$ in one gallon of water is added two pounds sodium carbonate (soda ash) and the mixture boiled for two minutes, after which the resulting sodium hypochlorite solution is separated from the precipitated calcium carbonate by filtration, the precipitate being washed with enough hot water to restore the original volume. In use, one part of sodium hypochlorite is diluted with 9 parts of water and then employed in the amount of one gallon of the diluted liquor to one pound of cotton fiber. The bleaching operation is carried out at a moderate temperature, preferably not exceeding 40° C. and continued for about three hours.

The bleaching is completed when the fiber has acquired a bluish-white appearance whereupon it is washed in water until free from odor and is without alkaline reaction. The fiber freed from excess water by centrifuging is then ready for solution as above described. If the fiber is to be kept in storage before dissolving it may be dried at about 60° until the moisture content is reduced to about 50%.

My process lends itself to easy recovery of the ammonia and the copper. Thus ammonia is given off in the alkaline coagulating and aging tanks and is removed therefrom by means of a suction fan (the tanks being closed) in accordance with standard ammonia recovery practice. For the purpose of recovering the copper, the decolorizing bath consisting of dilute sulphuric acid, after it has become exhausted, is preferably filtered and then evaporated to crystalize out the copper sulphate.

The above outlined procedure for treating the fiber has the advantage that the major quantity of the natural incrustations of the cotton fiber and of the hull fiber is not destroyed and is retained in the regenerated product where it imparts valuable water-proofing qualities thereto. This is due not only to the fact that greater advantage is taken of the dissolving power of the cuprammonium reagent but also to the fact that in prior methods the fibers might be said to be attacked by the solvent from the outside. The fiber as it is reduced in volume on being dissolved brings about a coalescence of the incrustations, thereby tending to insulate the undissolved remainder of the fiber from the action of the solvent. Accordingly, my process is particularly adapted for the dissolution of cellulose obtained from cotton seed hulls which have a high proportion of natural incrustations and are therefore difficult to dissolve by the old methods. Not only is dissolution effected quickly and easily but the nature of the action of the solvent and the manner in which it is used are such as to preserve these incrustations so that they are added to cellulose when it is regenerated and impart valuable properties thereto. Other methods of treating the fiber before solution may be employed, if desired. After the cellulose has been dissolved it may be cast into any desired form, as sheets or threads, and coagulated by immersion in an alkaline bath, as is known in the art.

An explanation of the quick action of my improved method of dissolving cellulose fiber is as follows: When the copper sulphate is dissolved in the ammonia, the copper radical combines with a portion of the ammonia to form the cuprammonium complex ion characterized by the well-known deep blue color. This cuprammonium solution, however, in itself is not a solvent for the cellulose. To constitute it such a solvent it is necessary to increase the hydroxyl ion concentration of the solution by the addition of a suitable amount of caustic alkali. In my improved process, when the alkali is added the cuprammonium radical has already penetrated within the undissolved fiber so that dissolution of the cellulose takes place in the thus generated solvent with great rapidity. If substantial quantities of the alkali be added to the solution before the cellulose is added, such alkali will tend slowly to cause to dissolve some of the fibers before the cuprammonium radical can penetrate the fibers, with the result that dissolution of the cellulose is retarded and the full advantages of my invention are not obtained. Therefore, the presence of any substantial amount of alkali in contact with the cellulose, i. e. sufficient to cause swelling and dissolution of the fiber, before the cuprammonium solution has had an opportunity to impregnate the fibers is to be avoided.

The process according to the above example is adapted to making regenerated cellulose sheets capable of being fully water-proofed by coating with a simple pyroxylin lacquer and when so coated such sheets are suitable as wrapping material or as a base for photographic film or for other uses.

It will be understood that the example given is by way of illustration and that various changes may be made therein without departing from the spirit of the invention or the scope of the claims. The solution may be diluted if desired or the solution may be carried out in more dilute reagents.

The treating of cotton seed hulls or other cellulosic material in such a way as to preserve a substantial part of the natural incrustations thereof and the utilization of such residual incrustations is not claimed broadly in the present application as the same forms the subject matter of an application for patent filed by Daniel W. Losee on August 1, 1933, Serial No. 683,229, for Regenerated cellulose sheet or film and method of making same, which application is owned by the assignee of the present application. The making of regenerative cellulose sheets and waterproofing the same, mentioned above, is also not claimed herein as the same forms a part of the subject matter of said Losee application.

I claim:

1. The method of dissolving cellulose which consists in impregnating the cellulose fiber with a liquid preparation consisting substantially of a water soluble copper salt in aqueous ammonia in the absence of any amount of alkali metal hydroxide or hydroxyl ion from any other source sufficient to cause a swelling or dissolving of the fiber, and then after impregnation has taken place adding alkali metal hydroxide in an amount sufficient to effect dissolution.

2. The method of dissolving cellulose fibers, which consists in impregnating the fibers with essentially the reaction products of a water solution of a copper salt and ammonia, such products containing insufficient hydroxyl ion concentration to cause swelling or dissolution of any substantial portion of the cellulose whereby said impregnating solution constitutes a potential solvent of the cellulose and is caused to penetrate the undissolved and substantially unswollen fiber, and then adding alkali metal hydroxide in sufficient quantity to effect solution of said fibre upon reaction thereof with said potential solvent.

3. The method of dissolving cellulose fiber containing a substantial quantity of the natural incrustations of the cotton seed hulls which consists in impregnating said fibers with a liquid preparation consisting substantially of the reaction products of a water-soluble copper salt and aqueous ammonia in the absence of sufficient alkali metal hydroxide or hydroxyl ion from any other source to cause swelling or dissolution of any substantial portion of the cellulose whereby said impregnating solution constitutes a potential solvent of the cellulose and is caused to penetrate the fiber notwithstanding the presence of the incrustations and then adding alkali metal hydroxide in sufficient quantity to effect solution of said fiber upon reaction thereof with said potential solvent.

4. The process of dissolving cellulose which consists in treating cotton fibers, admixed with which may occur a considerable quantity of the hull fibers, with dilute alkali solution and with bleaching agents if necessary and stopping the treatment at a point so as to leave in the fibers a substantial portion of the naturally present incrustations, then immersing such fibers in a solution of a water-soluble copper salt in ammonia in the absence of any amount of alkali metal hydroxide or hydroxyl iron from any other source sufficient to cause a swelling or dissolving of the fiber, whereby said solution in which said fibers are immersed constitutes a potential solvent of the cellulose and is caused to penetrate the fiber notwithstanding the presence of the incrustations, and then adding a sodium hydroxide solution in sufficient quantity to dissolve said fiber upon reaction thereof with said potential solvent.

WERNER KLEINICKE.